Patented Oct. 10, 1922.

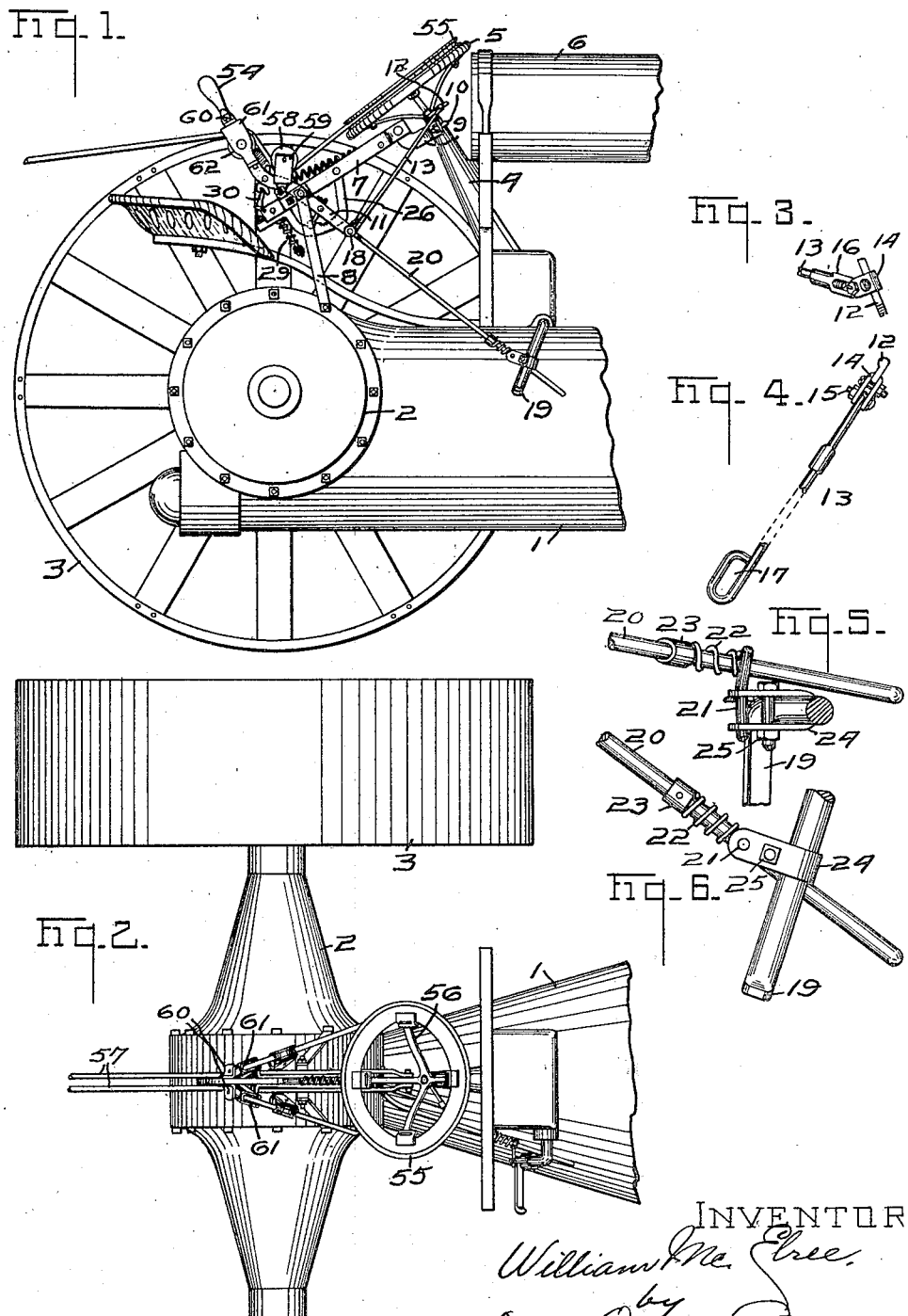

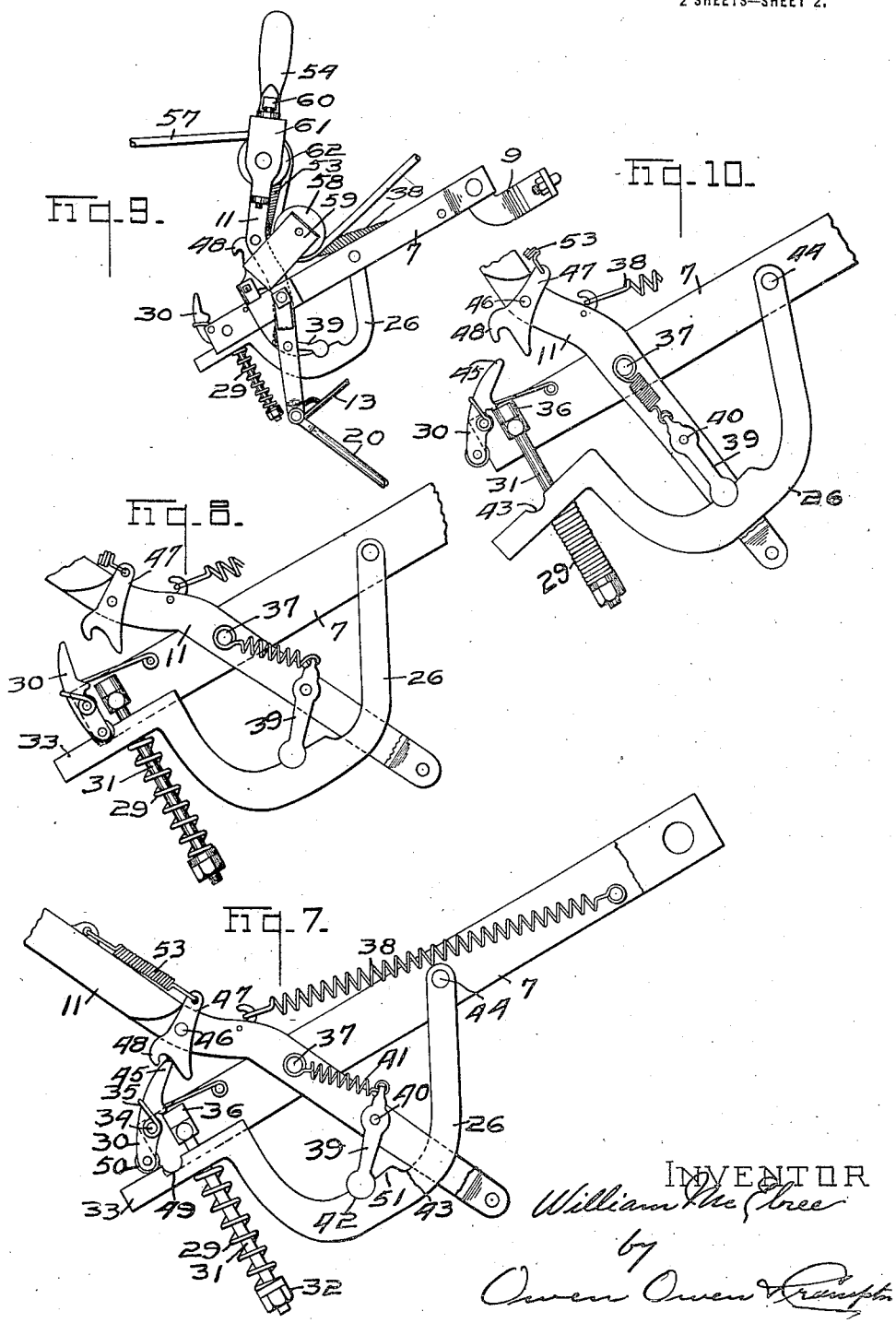

1,431,168

UNITED STATES PATENT OFFICE.

WILLIAM McELREE, OF DUNKIRK, OHIO.

DRIVING MECHANISM.

Application filed November 7, 1921. Serial No. 513,237.

*To all whom it may concern:*

Be it known that I, WILLIAM McELREE, a citizen of the United States, and a resident of Dunkirk, in the county of Hardin and State of Ohio, have made an Invention Appertaining to Driving Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a mechanism whereby tractors may be controlled by a pair of lines or "reins" from a point remote from the tractor, such as from a conveyance or an agricultural implement drawn by the tractor. Constructions containing the invention are so formed that they may be driven or directed by a pair of lines from a point remote from the tractor or may be driven by the mechanism, directly by an operator located on the tractor. The construction is also so formed that the parts thereof may be easily disconnected from the usual controlling mechanisms of the tractor and the tractor driven in the usual way by the pedal or lever and guiding or steering wheel without removing the construction from the tractor. The invention moreover has for its object to provide a relatively simple device which will respond with certainty to the operations of the pairs of lines and without requiring more than but little strength to operate the device.

Constructions containing the invention may partake of different forms. To illustrate a practical application of the invention I have selected a construction embodying the invention as an example of such constructions, and shall describe it hereinafter. The construction selected is illustrated in the accompanying drawings.

Figure 1 of the drawings is a side view of the device in normal position, that is, the position taken when the tractor has been brought to a stop. Fig. 2 is a top view of the device illustrated in Fig. 1. Fig. 3 is a top view of the connecting link to the throttle lever of the engine. Fig. 4 is a side view of the connection. Fig. 5 is a top view of the connection made with the clutch pedal. Fig. 6 is a side view of the connection illustrated in Fig. 5, Figs. 7, 8, 9 and 10 are larger views of the device in order that the operation of the structure may be shown. Fig. 7 illustrates the normal position. Fig. 8 illustrates the next position taken by parts of the device to start the tractor. Fig. 9 is the driving position, that is, when the tractor is going forward, and Fig. 10 is the position the parts take when the tractor is being brought to a standstill, the position shown in Figs. 1 and 7 being the next position or stationary position.

1 in Figs. 1 and 2 represents the tractor having the differential mechanism 2, the bull wheel 3, the steering post 4, the steering wheel 5 and the gas tank 6, these parts being shown conventionally for the purpose of illustrating the practical application of the invention to a tractor or any suitable power driven conveyance.

7 is a frame that consists of a pair of bars that are secured in an inclined position by means of the bars or brackets 8 that are connected to the frame 7 and to the differential housing 2 and by a bracket 9 that may be secured to the end of the frame 7 and to the steering post 4 by means of the U-bar 10. The brackets 8 and 9 merely operate to secure the frame 7 in position. Within the frame 7 is located a pivoted lever 11. The lower end of the lever 11 is connected to the throttle lever 12 that controls the supply of the fuel and air to the engine of the tractor by means of the link 13. A strap 14 is bolted to the throttle lever 12 and the end of the link 13 is connected to the strap by means of a bolt 15. The end of the link 13 may be threaded into an eye 16 for the purpose of adjusting the effective length of the link 13. The lower end of the link 13 is provided with an oblong eye 17 forming a slot through which the pin 18 extends and permits a limited amount of free movement of the pin 18 and the lower end of the lever 11 relative to the link 13.

The lower end of the lever 11 is also connected to the clutch pedal 19 by means of the link 20. The link 20 is connected by the pin 18 to the lever 11 and to the shank of the pedal 19 by means of the eye formed in the bent pin 21 through which the link 20 extends. The pedal 19 is provided with the usual spring to swing the pedal 19 upwards and towards the seat of the operator and so that when the pedal 19 is released the connection will be established between the engine and the bull wheels in the manner well known in the art. The spring of the pedal thus tends to force the pedal along the link or rod 20. The link 20 is provided with a compression spring 22 and with a collar 23 against which the spring is pressed by the pressure exerted by the eye pin 21 which is secured to the shank of the pedal by the strap 24 and the bolt 25. When the driving mechanism is in the position shown in Figure 1 the pedal 19 is held down and consequently the clutch is released and thus the crank shaft of the engine may rotate without driving the bull wheels and causing forward movement of the tractor. The lever 11 is held in this position by a releasable means that is operated by rearward movement of the lever.

A U-shaped bar 26 is pivoted at one end in the frame 7. It is spring-pressed by the spring 29 against a dog 30. The spring 29 is located on a rod 31 and between a nut or washer 32 and a laterally extending portion 33 of the U-shaped bar 26. The rod 31 is secured to the frame 7. It may be pivoted thereto to permit the slight angular movements of the U-shaped bar 26 relative to the frame 7. The dog 30 is pivoted on the pin 34 which is also secured in the frame 7. It is spring pressed by the spring 35 and so as to press it against a stop 36 that may be formed on the end of the rod 31. The lever 11 is pivoted on the rod 37 and its upper end is pulled forward by the spring 38 which is connected to the lever and to the frame 7. Forward movement of the lever is prevented by the tumbler or lock 39 which is pivotally connected to the lever 11 by means of the pin 40. The upper end of the tumbler 39 is connected by a spring 41 to the rod 37. The U-shaped bar 26 is provided with the recesses 42 and 43. The recess 42, the pivot pin 40 of the tumbler 39, and the pin 44 on which the U-shaped bar 26 is pivoted, in the position shown are substantially in line and so that the pressure of the spring 29 is sufficient to hold the U-shaped bar 26 against any downward pressure that may be exerted by reason of the spring 38 acting through the lever 11 and the tumbler 39. This holds the lever 11 in its position and holds the throttle lever 12 in closed position and the pedal 19 so as to hold the clutch in an open position.

In order to start the tractor the lever 11 is pulled rearward against the tension of the spring 38 to unlock the lever. The lever is held in locked position not only by the spring 38 and the tumbler 39, but also by the dog 30 since its pivot pin 34 is substantially in line with its engaging point 45 and the pivot pin 46 of a trip or latch 47 where it is held by the spring 35 and the stop 36. The slight rearward movement is resisted to a marked extent by the dog 30. Upon a further slight pressure the point 45 of the dog slides into the hook 48 of the trip 47 and swings the hook of the trip 47 upwards and thus permits the lever 11 to swing further back, pushing the upper end of the dog 45 rearwardly and drawing the tumbler 39 from the recess 42 upon the portion 51 between the recesses 42 and 43, while at the same time the end 45 of the dog is locked within the hook 48 and further backward movement of the lever 11 is prevented. Meantime the roller 50 enters the recess 49 formed in the laterally extending portion 33 of the U-shaped bar 26 and will be held there by the spring 29 notwithstanding the action of the spring 35. The upper end of the lever 11 is then permitted to be drawn forward by the spring 38 a short distance which causes the lower end of the tumbler to move into the recess 42 and draws the latch 47 from over the end 45 of the dog 30. The lever 11 is again pulled back to draw the lower end of the tumbler 39 over the ridge portion 51 and into the recess 43, there being sufficient play in the dog 30 to permit the movement as between the hook 48 and the upper end of the dog 45, as shown in Fig. 8. This places the lower end of the tumbler 39 at a point below the line between the pivot pins 40 and 44. The upper end of the lever 11 is then released to permit the spring 38 to draw the lever and since the recess 43 is of sufficient depth the tumbler 39 will not sufficiently depress the U-shaped bar 26 to permit the dog 30 to be released from its upright position. The lever 11 is permitted to be drawn forward as far as it will go, its movement being limited by the link 13 or by any other suitable stop.

This will thus place the device in the position shown in Fig. 9, and will cause the lower end of the lever to draw on the links 13 and 20 and thus open the throttle and release the pedal 19 and cause the tractor to start forward.

In order to stop the tractor the upper end of the lever 11 is pulled rearwardly against the action of the spring 38. The tumbler 39 has been drawn into the recess 42 as shown in Fig. 9, and when the upper end of the lever 11 is pulled back the tumbler 39 rotates on its pivot 40 and with a toggle joint action pushes the U-shaped bar 26 down and releases the dog 30 as shown in Fig. 10. The upper end of the lever 11 is pulled back until the latch 46 strikes the end 45 of the dog, which stops further rearward movement of the lever 11 and at the same time the tumbler 39 permits the U-shaped bar 26 to be raised by the action of the spring 29 into the position shown in Fig. 7 wherein the lower end of the tumbler 39 is substantially in line with the pivot pins 40 and 44 and so as to hold the lever 11 in that position notwithstanding the action of the spring 38.

This pushes forward the throttle lever 12 and pushes the pedal 19 down to neutral position, which stops the forward movement of the tractor since the clutch releases the engine from the driving gear, that is, the differential and the bull wheels.

For the operation of the lever 11 it may be provided with a handle 54 or it may be operated by a pair of lines that may extend around a grooved ring secured to the steering wheel 5. By my invention I have thus provided a means whereby the driving mechanism may be controlled by the operator while seated in the tractor or it may be operated at a point remote from the tractor, as from a conveyance or an agricultural implement drawn by the tractor. The lines are looped over the grooved ring 55 that may be attached by any suitable means to the spokes 56 of the steering wheel. Thus if either one of the lines 57 is pulled the steering wheel will be rotated. The lines pass beneath a pair of idlers 58 located in the blocks 59 that are secured to the frame 7. The upper end of the lever 11 is provided with a pair of brackets 60 to which are connected a pair of pulley blocks 61. The lines 57 also pass over the pulley wheels 62 supported in the blocks 61. The upper end of the lever may thus be manipulated in the manner described by a rearward pull of both of the lines 57 to cause the tractor to start and to stop. By this arrangement the tractor may be controlled by a driver located somewhat remote from the tractor.

I claim:

1. In a tractor driving mechanism, a lever connected to the throttle lever and clutch pedal of the tractor for operating said parts of the tractor, means for limiting the movement of the lever and preventing the return movement of the lever until the lever has been pulled back a short distance, moved forward and again moved back.

2. In a tractor driving mechanism, a pair of lines connected to the steering wheel of the tractor for operating the steering wheel, a spring actuated means connected to the lines and to the throttle lever and the clutch pedal of the tractor, a stop for limiting the movement of the said means and a catch coacting with the said stop and controlled by the movement of the said means to permit return movements of the said means.

3. In a tractor driving mechanism, a lever connected to the throttle and to the pedal of the tractor, a tumbler for latching the lever, means controlled by the movement of the lever for operating the tumbler to permit the return movement of the lever.

4. In a tractor driving mechanism, a lever connected to the throttle and the clutch of the tractor, a latching tumbler for holding the lever in one position, a latch for limiting the movement of the lever in one direction and operated by movements of the lever to cause the operation of the latching tumbler to release the lever and permit return movement of the lever.

5. In a tractor driving mechanism, a lever connected to the clutch and the throttle of the tractor, a latching tumbler for engaging the lever, a latch and a dog for limiting the movement of the lever and controlling the latching tumbler.

6. In a tractor driving mechanism, a lever connected to the throttle and clutch of the tractor, a dog for limiting the movement of the lever, a tumbler connected to the lever for controlling the dog.

7. In a tractor driving mechanism, a lever connected to the throttle and clutch of the tractor, a dog for limiting the movement of the lever, a tumbler connected to the lever for controlling the dog, a latch connected to the lever for operating the dog.

8. In a tractor driving mechanism, a lever connected to the throttle and the clutch of the tractor, a tumbler and a latch connected to the lever, a dog controlled by the tumbler and operated by the latch for limiting the movement of the lever.

9. In a tractor driving mechanism, a lever connected to the throttle and the clutch of the tractor, a tumbler connected to the lever and a dog for limiting the movement of the lever, a member interconnecting the dog and the tumbler and operated by the tumbler for controlling the dog.

10. In a tractor driving mechanism, a lever connected to the throttle and to the clutch of the tractor, a latch and a tumbler connected to the lever, a dog coacting with the latch to limit the movement of the lever, a member coacting with the tumbler for limiting the movement of the lever.

11. In a tractor driving mechanism, a lever connected to the throttle and to the clutch of the tractor, a latch and a tumbler connected to the lever, a dog coacting with the latch to limit the movement of the lever, a member coacting with the tumbler for limiting the movement of the lever and for controlling the dog.

12. In a tractor driving mechanism, a lever connected to the throttle and clutch of the tractor, a dog for limiting the movement of the lever, a tumbler connected to the lever for controlling the dog, a pair of lines connected to the steering mechanism of the tractor and to the lever for operating the steering mechanism and the lever.

13. In a tractor driving mechanism, a lever connected to the throttle and clutch of the tractor, a dog for limiting the movement of the lever, a tumbler connected to the lever for controlling the dog, a latch connected to the lever for operating the dog, a pair of lines connected to the steering mechanism of the tractor and to the lever for operating the steering mechanism and the lever.

14. In a tractor driving mechanism, a lever connected to the throttle and the clutch of the tractor, a tumbler and a latch connected to the lever, a dog controlled by the tumbler and operated by the latch for limiting the movement of the lever, a pair of lines connected to the steering mechanism of the tractor and to the lever for operating the steering mechanism and the lever.

15. In a tractor driving mechanism, a lever connected to the throttle and the clutch of the tractor, a tumbler connected to the lever and a dog for limiting the movement of the lever, a member interconnecting the dog and the tumbler and operated by the tumbler for controlling the dog, a pair of lines connected to the steering mechanism of the tractor and to the lever for operating the steering mechanism and the lever.

16. In a tractor driving mechanism, a lever connected to the throttle and to the clutch of the tractor, a latch and a tumbler connected to the lever, a dog coacting with the latch to limit the movement of the lever, a member coacting with the tumbler for limiting the movement of the lever, a pair of lines connected to the steering mechanism of the tractor and to the lever for operating the steering mechanism and the lever.

17. In a tractor driving mechanism, a lever connected to the throttle and to the clutch of the tractor, a latch and a tumbler connected to the lever, a dog coacting with the latch to limit the movement of the lever, a member coacting with the tumbler for limiting the movement of the lever and for controlling the dog, a pair of lines connected to the steering mechanism of the tractor and to the lever for operating the steering mechanism and the lever.

In testimony whereof, I have hereunto signed my name to this specification.

WILLIAM McELREE.